US009846599B1

(12) United States Patent
Baranczyk et al.

(10) Patent No.: US 9,846,599 B1
(45) Date of Patent: Dec. 19, 2017

(54) ADAPTIVE QUERY CURSOR MANAGEMENT

(71) Applicant: International Business Machines Corporation, Armonk, NY (US)

(72) Inventors: Shawn J. Baranczyk, Rochester, MN (US); Rafal P. Konik, Oronoco, MN (US); Roger A. Mittelstadt, Byron, MN (US); Brian R. Muras, Otsego, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/339,511

(22) Filed: Oct. 31, 2016

(51) Int. Cl.
*G06F 9/46* (2006.01)
*G06F 9/50* (2006.01)
*G06F 17/30* (2006.01)

(52) U.S. Cl.
CPC ...... *G06F 9/5011* (2013.01); *G06F 17/30289* (2013.01)

(58) Field of Classification Search
None
See application file for complete search history.

(56) References Cited

U.S. PATENT DOCUMENTS

| 6,044,216 | A | 3/2000 | Bhargava et al. |
| 6,959,305 | B2 | 10/2005 | Bird et al. |
| 7,136,847 | B2 | 11/2006 | Dang et al. |
| 7,251,657 | B2 * | 7/2007 | Saha ............... G06F 17/30457 |
| 7,689,550 | B2 | 3/2010 | Lee et al. |
| 7,991,796 | B2 | 8/2011 | Cotner et al. |
| 8,301,667 | B2 | 10/2012 | Hung et al. |
| 8,392,408 | B1 | 3/2013 | Fuller |
| 8,612,284 | B1 * | 12/2013 | Sharif ................. G06F 3/067 |
| | | | 705/400 |
| 8,768,904 | B2 | 7/2014 | Baranczyk et al. |
| 9,043,309 | B2 | 5/2015 | Ahmed et al. |
| 2005/0160101 | A1 * | 7/2005 | Gallagher ......... G06F 17/30595 |
| 2007/0025389 | A1 * | 2/2007 | Garg .................. H04L 43/0811 |
| | | | 370/449 |
| 2007/0276784 | A1 * | 11/2007 | Piedmonte ....... G06F 17/30404 |
| 2007/0276802 | A1 * | 11/2007 | Piedmonte ....... G06F 17/30463 |
| 2008/0172369 | A1 * | 7/2008 | Baranczyk ....... G06F 17/30442 |
| 2009/0150338 | A1 * | 6/2009 | Forstie ............. G06F 17/30477 |

(Continued)

OTHER PUBLICATIONS

Burleson Consulting, "open_cursors Tips", Mar. 23, 2015, "http://www.dbaoracle.com/t_open_cursors.htm".*

(Continued)

*Primary Examiner* — Mehran Kamran
(74) *Attorney, Agent, or Firm* — Patterson + Sheridan, LLP (57) ABSTRACT

Techniques are provided for managing a database cursor threshold. One embodiment provides a method that includes setting a database cursor threshold, for a first database job of a plurality of database jobs, to a first value. Generally, the cursor threshold defines the maximum number of database cursors that are permitted to be open at a time in a database system. One or more system resources of the database system are monitored, and upon detecting that a current state of the one or more system resources satisfies predefined criteria, embodiments set the database cursor threshold to a second value.

11 Claims, 4 Drawing Sheets

(56) References Cited

U.S. PATENT DOCUMENTS

| | | | |
|---|---|---|---|
| 2009/0157742 A1* | 6/2009 | Anderson | G06F 9/5016 |
| 2010/0332531 A1* | 12/2010 | Galande | G06F 17/30575 707/770 |
| 2011/0307615 A1* | 12/2011 | Krishnaswamy | G06F 17/30457 709/227 |
| 2013/0117313 A1* | 5/2013 | Miao | G06F 21/6227 707/781 |
| 2013/0325841 A1* | 12/2013 | Ahmed | G06F 17/30448 707/713 |
| 2014/0095472 A1 | 4/2014 | Lee et al. | |
| 2014/0095474 A1 | 4/2014 | Chakkappen et al. | |
| 2014/0095475 A1* | 4/2014 | Su | G06F 17/30463 707/718 |
| 2014/0379669 A1* | 12/2014 | Driesen | G06F 17/303 707/690 |
| 2015/0261408 A1 | 9/2015 | Ostergren et al. | |
| 2015/0331751 A1* | 11/2015 | Saeki | G06F 17/30312 707/679 |
| 2015/0370824 A1* | 12/2015 | Chui | G06F 17/30289 707/786 |
| 2016/0103878 A1* | 4/2016 | Boe | G06F 17/30572 707/718 |

OTHER PUBLICATIONS

Li et al., "Cursor Management for XML Data", ASym 2003, LNCS 2824, pp. 52-69, 2003. © Springer-Verlag Berlin Heidelberg 2003.

Grossman, et al., "The Bubble Cursor: Enhancing Target Acquisition by Dynamic Resizing of the Cursor's Activation Area", CHI SIGCHI Conference, Apr. 2-7, 2005, Portland, Oregon, USA, pp. 281-290.

"Cursor (databases)", retrieved Aug. 3, 2016 <https://en.wikipedia.org/wiki/Cursor_%28databases%29>, Wikipedia, last modified on Jul. 6, 2016, 6 pages.

"Oracle® Database Performance Tuning Guide", 11g Release 2 (11.2), Part No. E16638-06, retrieved Aug. 3, 2016, <http://docs.oracle.com/cd/E28271_01/server.1111/e16638/build_db.htm>11 pages.

IBM Knowledge Center, "QAQQINI query options Version 7.2", retrieved Aug. 3, 2016, <https://www.ibm.com/support/knowledgecenter/ssw_ibm_i_72/rzajq/qryopt.htm> 2 pages.

* cited by examiner

ADAPTIVE QUERY CURSOR MANAGEMENT

BACKGROUND

The present invention relates to database cursors, and more specifically, to dynamically adjusting the maximum number of cursors for a database job or within a database system, and intelligently selecting cursors to close when the limit is reached.

In many database management systems (DMBS), query cursors (or database cursors) are used to traverse over and access records in the database as required by various jobs, threads, applications, and users.

Frequently, once a cursor has been created, it is saved so that future queries may reuse it, for example, if the same query is run again. In this way, future queries can be completed more quickly as the system does not need to rebuild a cursor each time the same query is received by the database system. In addition to saving time, reusing cursors helps to reduce the processing and memory resources needed by future queries.

At any given time, it is common to have a large number of cursors open on a database system, as there may be hundreds or thousands of jobs, threads, applications, and users accessing the same database, and each may open hundreds or thousands of cursors. Thus as the workload grows, the DBMS may begin to be burdened by the excessive number of cursors that have not been closed, for example, the system may run out of RAM or may generally suffer from poorer performance due to the number of database cursors that are open.

SUMMARY

According to one embodiment of the present invention, a method includes setting a database cursor threshold, for a first database job of a plurality of database jobs, to a first value. Generally, the cursor threshold defines the maximum number of database cursors that are permitted to be open at a time (e.g., within a database system as a whole, specifically for the first database job, etc.). The method includes monitoring one or more system resources of the database system. Additionally, the method includes, upon detecting that a current state of the one or more system resources satisfies predefined criteria, setting the database cursor threshold to a second value.

Another embodiment provides a computer-readable storage medium containing computer-readable program code that, when executed by operation of one or more computer processors, performs an operation. The operation includes setting a database cursor threshold, for a first database job of a plurality of database jobs, to a first value. Generally, the cursor threshold defines the maximum number of database cursors that are permitted to be open at a time in a database system. The operation also includes monitoring one or more system resources of the database system. Additionally, the operation includes, upon detecting that a current state of the one or more system resources satisfies predefined criteria, setting the database cursor threshold to a second value.

Yet another embodiment provides a system that includes one or more computer processors and a memory containing computer program code that, when executed by operation of the one or more computer processors, performs an operation. The operation includes collecting usage metrics for each of a plurality of database cursors, wherein the usage metrics comprise at least one of: (a) a runtime of each respective database cursor, (b) a cost of each respective database cursor, and (c) a history of each respective database cursor. The operation also includes, upon determining that a database cursor threshold has been exceeded, wherein the database cursor threshold defines the maximum number of database cursors that are permitted to be open at a time, selecting, based on the collected usage metrics, a database cursor of the plurality of database cursors, and closing the selected cursor.

DETAILED DESCRIPTION

In order to prevent the system from being burdened by thousands or millions of open cursors, many DBMS provide an internal threshold number, or maximum limit, that can be set by a user. When the number of open cursors reaches this limit, cursors are closed automatically so as to allow the DBMS to continue to operate efficiently. Generally, such thresholds can be set in a variety of different contexts. For example, cursor thresholds could be set on a per database job basis, on a per user basis, for the database system as a whole, etc.

Unfortunately, these thresholds must typically be manually set by a user. Additionally, these systems typically close the oldest cursors first, which results in inefficiencies. For these reasons, there is a need for a system that adaptively adjusts the cursor threshold while the DBMS is running, and intelligently selects cursors to close.

The descriptions of the various embodiments of the present invention are presented herein for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a database system) or related data available in the cloud. For example, the database management system could execute on a computing system in the cloud and database cursors could operate on the system there. In such a case, the database system could store the database cursors at a storage location in the cloud and adjust the number of cursors that are allowed to be open at one time, as well as select cursors to be closed using processing in the cloud. Doing so allows a user to access this information from any computing system attached to a network connected to the cloud (e.g., the Internet).

Figure 1:
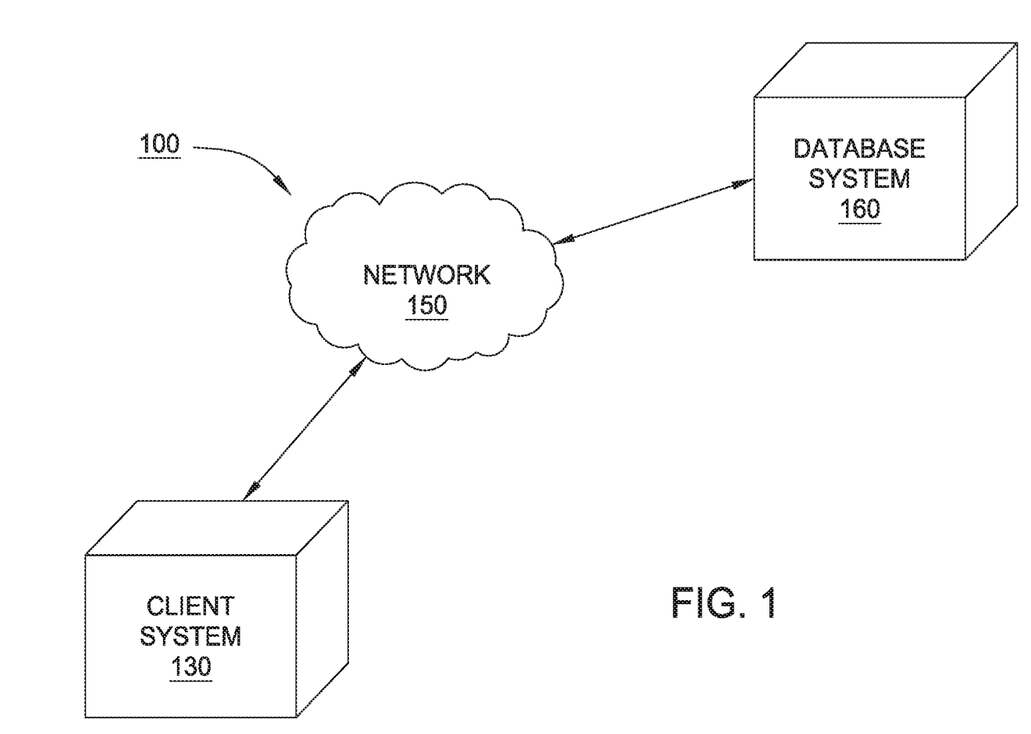
FIG. 1 is a block diagram illustrating a system configured to manage database cursors according to an embodiment of the present disclosure.

FIG. 1 illustrates a block diagram of a system 100 capable of implementing one embodiment of the present disclosure. In FIG. 1, a Client System 130 is communicatively linked to a Database System 160, for example, through a Network 150. Of course, the Client System 130 and the Database System 160 may communicate over any communication path, for example, the Internet, a local connection, wired or wireless communication, fiber optic connections, or any other method. Generally, the Client System 130 has one or more threads, jobs, or applications, each of which access data on the Database System 160 through queries. Database System 160 can create and store cursors in order to make future queries more efficient. When too many cursors have been opened such that the Database System 160 is in danger of excessive burden that would slow or stop the system, it can adjust the cursor threshold to prevent burden and can also select cursors to close based on a variety of factors, which is explained in more detail below.

Figure 2:
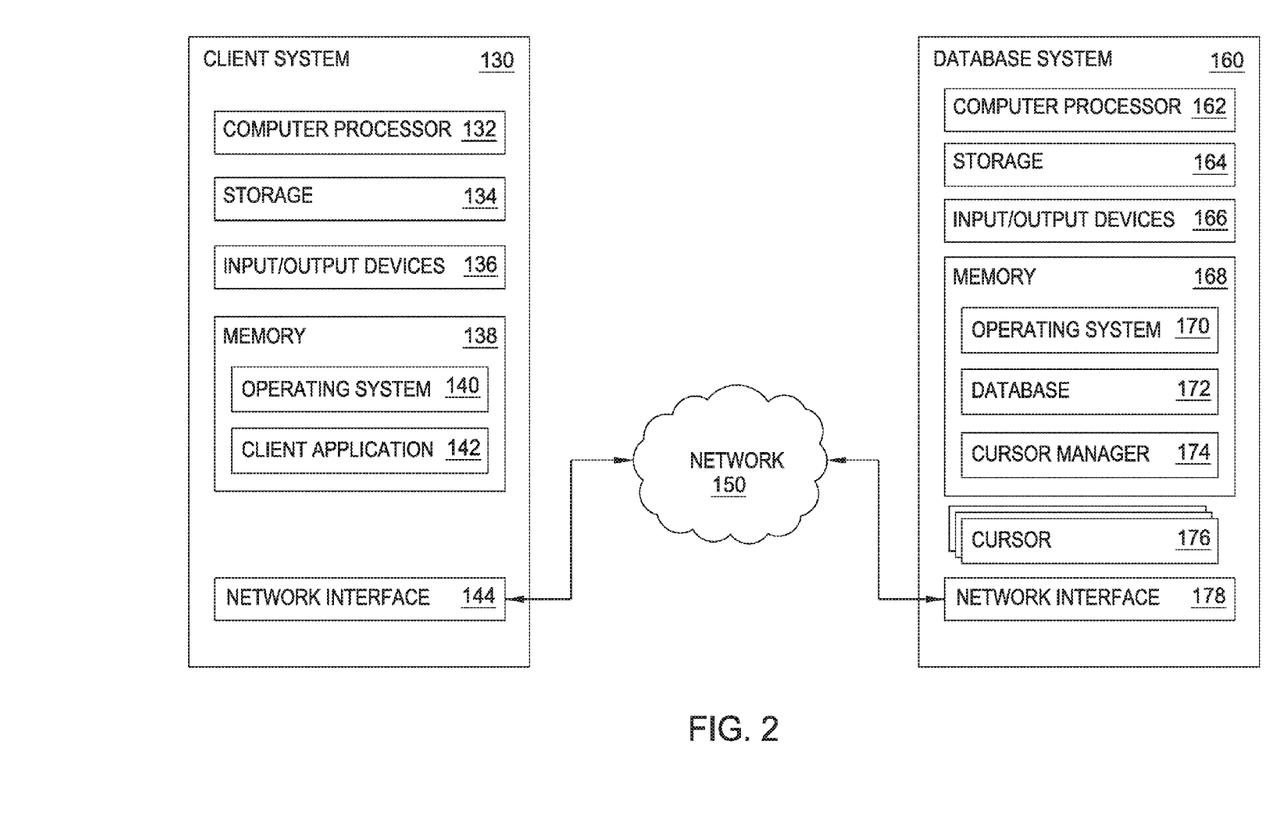
FIG. 2 is a block diagram illustrating a system configured to manage database cursors according to an embodiment of the present disclosure.

FIG. 2 illustrates a block diagram of a system 100 capable of implementing one embodiment of the present disclosure. In FIG. 2, Client System 130 communicates with Database System 160 using Network 150. Client System 130 contains various components, including Computer Processor 132, Storage 134, Input and Output Devices 136, Memory 138, and Network Interface 144. Memory 138 contains Operating System 140 and Client Application 142. Database System 160 contains similar components, including Computer Processor 162, Storage 164, Input/Output Devices 166, Memory 168, and Network Interface 178. Memory 168 contains Operating System 170, Database 172, Cursor Manager 174, and a plurality of Cursors 176. When a query is submitted, for example by Client Application 142, Cursor Manager 174 may create and open a cursor to be used for executing the query. In some embodiments, an entity other than Cursor Manager 174 may be responsible for opening new cursors. Cursors 176 are stored so that if a query is submitted again at a later time, it can be executed more quickly and more efficiently.

In order to prevent the system from bogging down under excessive load, Cursor Manager 174 monitors the environment and dynamically adjusts the maximum number of cursors that may be open at a time. For example, in one embodiment, Cursor Manager 174 or a similar component monitors the aggregate size of all of the Cursors 176. Because each Cursor 176 can vary significantly in size, the actual number of open Cursors 176 is frequently not a good predictor for how much space is being consumed by them, and a better metric is the actual aggregate size of the Cursors 176. In this embodiment, rather than simply counting the number of Cursors 176, Cursor Manager 174 may instead aggregate the amount of memory being consumed by the Cursors 176 and adjust the cursor threshold accordingly. For example, if the aggregate size of Cursors 176 is relatively small, Cursor Manager 174 may increase the cursor threshold because the system is not overly burdened, and can handle more cursors. Alternatively, if the Cursors 176 are relatively large such that their aggregate size is relatively large, Cursor Manager 174 may reduce the cursor threshold because although there are not many Cursors 176, the Database System 160 cannot open more cursors without unacceptable slow down or other problems.

In another embodiment, Cursor Manager 174 may monitor the amount of RAM available, the speed of the memory, and/or the current load on the Computer Processor 162. In such an embodiment, Cursor Manager 174 dynamically adjusts the cursor threshold based on these metrics. For example, regardless of the number of Cursors 176 or the aggregate size of the Cursors 176, Cursor Manager 174 may determine that extra RAM is available and decide to increase the cursor threshold. Additionally, Cursor Manager 174 may determine that there is not much RAM available and reduce the cursor threshold. Such a situation could arise if, for example, a user adds or removes RAM from the Database System 160, or if other processes on the system start or stop and being consuming RAM. In a related embodiment, Cursor Manager 174 may monitor the speed of the memory where Cursors 176 are stored. In such an embodiment, Cursor Manager 174 may increase the cursor threshold when Memory 168 is preforming quickly, and may reduce the cursor threshold when Memory 168 is slow. In another related embodiment, Cursor Manager 174 monitors the load or speed of Computer Processor 162 in order to determine whether to increase or reduce the cursor threshold. For example, if Cursor Manager 174 determines that Computer Processor 162 is bogged down, it may reduce the cursor threshold in order to alleviate strain on the system. Alternatively, Cursor Manager 174 may increase the cursor threshold upon determining that Computer Processor 162 can handle more open Cursors 176.

In one embodiment, Cursor Manager 174 may monitor the number of threads or jobs that are using the Database System 160, or the amount of resources that these threads or jobs are utilizing. These metrics may provide additional data to effectively adjust the cursor threshold dynamically. For example, if a large number of threads or jobs are using the Database System 160, or they are using a large amount of resources, the Cursor Manager 174 can reduce the cursor threshold to avoid adding additional strain to the system. Alternatively, if the number of threads or jobs is relatively smaller, or the resources being consumed are smaller, Cursor Manager 174 may increase the cursor threshold because it determines that the Database System 160 can handle more open Cursors 176.

In another embodiment, Cursor Manager 174 monitors the history of the Cursors 176, for example, what percentage of Cursors 176 have been reused or how frequently incoming queries can use an existing Cursor 176 rather than opening a new one. These metrics can provide powerful information about how efficiently the Database System 160 is reusing cursors, and therefore how efficient it is to keep those Cursors 176 open. In such an embodiment, Cursor Manager 174 may increase the cursor threshold and allow more cursors to be created because the existing cursors are being reused at a high rate. This allows the system to enjoy greater efficiency because each cursor is likely to be reused, and it would be a waste of resources to force some of them to close, only to be rebuilt soon thereafter. Alternatively, if Cursor Manager 174 determines that the percentage of reuse hits versus misses is low or that the percentage of Cursors 176 that have been reused is low, it may lower the cursor threshold. In this example, the Cursors 176 that are being stored are not being reused much anyway, so it will not harm system efficiency to have fewer of them open at a time, and it may be advantageous to free up Memory 168 for other uses.

In one embodiment, Cursor Manager 174 may monitor the system to learn the history of the jobs that use the Database System 160. For example, this metric could include information about how long a job or thread is expected to run, and what queries are expected to be used. In such an embodiment, Cursor Manager 174 may adjust the cursor threshold based on recognizing one or more jobs being run, and understanding what resources and Cursors 176 may be required. For example, if Cursor Manager 174 determines that a job is likely to need more Cursors 176 before finishing, it may increase the cursor threshold to accommodate this job or thread, and reduce the cursor threshold after the job has finished running.

In one embodiment, Cursor Manager 174 may adjust the cursor threshold on the level of individual jobs, applications, or threads rather than on a system-wide basis. For example, Cursor Manager 174 may allow each job, application, or thread to have the same number of open Cursors 176, or may increase the threshold for some while reducing it for others. Such adjustment may be made on the basis of any of the metrics discussed above, or any other useful metric. For example, if some jobs are seeing very high cursor reuse percentages, the Cursor Manager 174 may allow that job to have more open Cursors 176 by increasing the respective cursor threshold. Similarly, if a job has a low cursor reuse percentage, Cursor Manager 174 may reduce its associated cursor threshold to prevent it from wasting system resources. In this way, the Database System 160 can operate more efficiently and adjust its thresholds dynamically on a job, application, or thread specific level rather than on a system-wide level.

In addition to dynamically adjusting the cursor threshold on a system-wide or more narrow basis, it is important to have a rigorous method in place to close cursors once they are no longer needed or once the Database System 160 is in danger of being excessively burdened. In some embodiments, Cursor Manager 174 additionally selects Cursors 176 that should be close when the need arises. Cursor Manager 174 could choose a Cursor 176 to close in a variety of ways, including by age. For example, in one embodiment, Cursor Manager 174 may select the Cursor 176 that is the oldest and close Cursors 176 in a first-in-first-out manner. In a related embodiment, Cursor Manager 174 may select the Cursor 176 that has not been reused in the longest time. For example, when a Cursor 176 is reused, Cursor Manager 174 may treat it as if it was just created, and not select that Cursor 176 unless it is still the oldest of the Cursors 176. In this embodiment, Cursor Manager 174 selects Cursors 176 to close based on how much time has passed since they were last used, regardless of when the Cursor 176 was actually created.

In an embodiment, Cursor Manager 174 may select a Cursor 176 to close based on the runtime of each Cursor 176. For example, if a particular query cursor has a particularly long runtime, Cursor Manager 174 can select that Cursor 176 to be closed because the time it will take to rebuild the Cursor 176 is relatively small compared to how long it takes to run. Thus, closing the Cursor 176 may have little effect on the efficiency of the Database System 160 because the time it takes to rebuilt that Cursor 176 is small and will have little impact on the total time it takes to return a result for a query that uses that Cursor 176. In a related embodiment, if a Cursor 176 has a particularly fast runtime, Cursor Manager 174 may avoid closing that Cursor 176 because rebuilding it will add an appreciable amount of time to the total execution time as compared to simply using the fast Cursor 176 without rebuilding.

In one embodiment, Cursor Manager 174 may gather data and monitor Cursors 176 to determine the history of each Cursor 176. For example, if a Cursor 176 is frequently reused soon, Cursor Manager 174 may decide to not close that Cursor 176 even if it is old. Cursor Manager 174 may predict reuse based on monitoring the Cursors 176 and how they are used. In a related embodiment, Cursor Manager 174 may learn how long a particular thread or job is likely to continue based on previous executions. In such an embodiment, Cursor Manager 174 may leave a Cursor 176 open because the thread it is associated with will likely end soon, and the Cursor 176 will be closed at that time. In this way, Cursor Manager 174 learns from the history of the jobs, threads, and Cursors 176 and selects Cursors 176 to close based on this information.

In one embodiment, Cursor Manager 174 selects a Cursor 176 to be closed based on the size of each respective Cursor 176. For example, if a particular Cursor 176 requires a relatively large amount of space in memory, Cursor Manager 174 may decide to close that Cursor 176 because doing so will free up a relatively large number of resources. Similarly, if Cursor Manager 174 determines that a Cursor 176 takes up a small amount of memory, that Cursor 176 may not be a good candidate to close because doing so will not alleviate much of the burden on the Database System 160.

In one embodiment, Cursor Manager 174 considers the costs to rebuild each Cursor 176 when deciding which to close and which to leave open. For example, Cursors 176 that take a large amount of time to build are good candidates to be left open, whereas Cursors 176 that can be built relatively quickly are good candidates to be closed because doing so will have a smaller impact on queries that use that Cursor 176. In a related embodiment, Cursor Manager 174 may consider other costs of rebuilding each Cursor 176, such as how much it will burden the Computer Processor 162 or how many other resources rebuilding it will require.

In some embodiments, Cursor Manager 174 monitors Cursors 176 to determine the number of reuses each Cursor 176 has been used for. In such an embodiment, Cursors 176 that have been reused a relatively high number of times may be better to keep open, whereas Cursors 176 that have never been reused or have been reused only sparingly are likely good candidates to be closed because doing so will not unduly burden users. In a related embodiment, Cursor Manager 174 monitors the frequency with which Cursors 176 are reused in addition to or instead of the absolute number of times it has been reused. In such an embodiment, the Cursor Manager 174 may select a Cursor 176 to close because it is reused infrequently, rather than another Cursor 176 that is used frequently, even if the selected Cursor 176 has actually been reused more times. For example, if one Cursor 176 has been reused a total of fifty times and is reused every five seconds while another Cursor 176 has been reused a total of seventy-five times and is reused every eight seconds, Cursor Manager 174 may decide to close the second Cursor 176 because although it has more total reuses, it is reused less frequently.

In one embodiment, Cursor Manager 174 considers the resources that are used by each Cursor 176 when deciding which Cursor 176 to close. For example, the Cursor Manager 174 may monitor the number of locks that each Cursor 176 uses, the number of tables that each Cursor 176 affects, the amount of RAM that each Cursor 176 uses when running (as opposed to simply how much memory it consumes while being stored), or the load placed on the Computer Processor 162 by each Cursor 176 when executed. In such an embodiment, Cursors 176 that are resource-intensive may be good candidates to be closed because doing so will free up more significant resources for other processes and Cursors 176.

In an embodiment, Cursor Manager 174 monitors each Cursor 176 to determine the number of users, threads, jobs, or applications that are using each Cursor 176. In such an embodiment, Cursors 176 that are used by a relatively higher number of processes should left open because closing them would affect a relatively large number of processes. In contrast, Cursors 176 that are used by few or a single user, thread, job, or application can likely be closed without causing much undue burden because they are not used by as many entities. This allows Database System 160 to run more efficiently without burdening an excessive number of processes.

In some embodiments, Cursors 176 are not all stored in Memory 168. For example, some Cursors 176 may be stored in Memory 168, but others may be stored in Storage 164, or in another location either in Database System 160 or remote from the system. Cursors 176 could be stored in RAM, cache memory, virtual storage, a solid state drive, a hard drive, flash memory, or any other type of storage. In such an embodiment, Cursor Manager 174 may select Cursors 176 to close based on where they are stored. For example, Cursors 176 located in relatively slow storage may be closed instead of Cursors 176 located in faster memories. In a related embodiment, Cursors 176 that are stored in storage medium with a high capacity may be left open because closing them would be unlikely to be of much benefit. Similarly, Cursors 176 that are stored in relatively small capacity storage may be good candidates for closure because they consume a relatively higher portion of that memory.

In one embodiment, Cursor Manager 174 may monitor the system and select Cursors 176 to be closed based on how each job, application, thread, or user is using the Database System 160. In such an embodiment, if a particular job is using more Cursors 176 or more resources than its fair share, Cursor Manager 174 may select one or more Cursors 176 associated with that job to be closed if the threshold is reached. This can prevent a single job from monopolizing resources to the detriment of other jobs that are running, and force each job to use a proportionate share of system resources.

Figure 3:
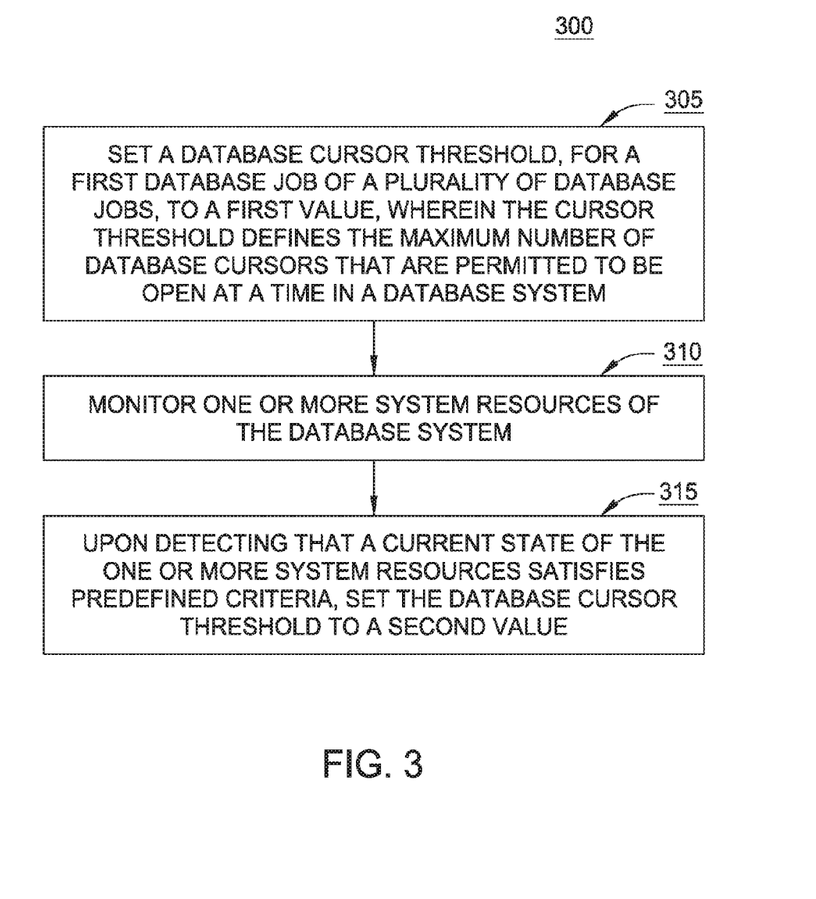
FIG. 3 is a flow diagram illustrating a method for dynamically adjusting the maximum number of cursors allowed to be open at one time in a database system, according to one embodiment of the present disclosure.

FIG. 3 is a flow diagram illustrating a method for dynamically adjusting the cursor threshold, according to embodiments disclosed herein. In the illustrated embodiment, the method 300 begins at block 305 where Cursor Manager 174 sets a database cursor threshold, for a first database job of a plurality of database jobs, to a first value, wherein the cursor threshold defines the maximum number of database cursors that are permitted to be open at a time in a database system. The method 300 continues at block 310, where Cursor Manager 174 monitors one or more system resources of the database system. The method concludes at block 315, where Cursor Manager 174 detects that a current state of the one or more system resources satisfies predefined criteria, and sets the database cursor threshold to a second value.

Figure 4:
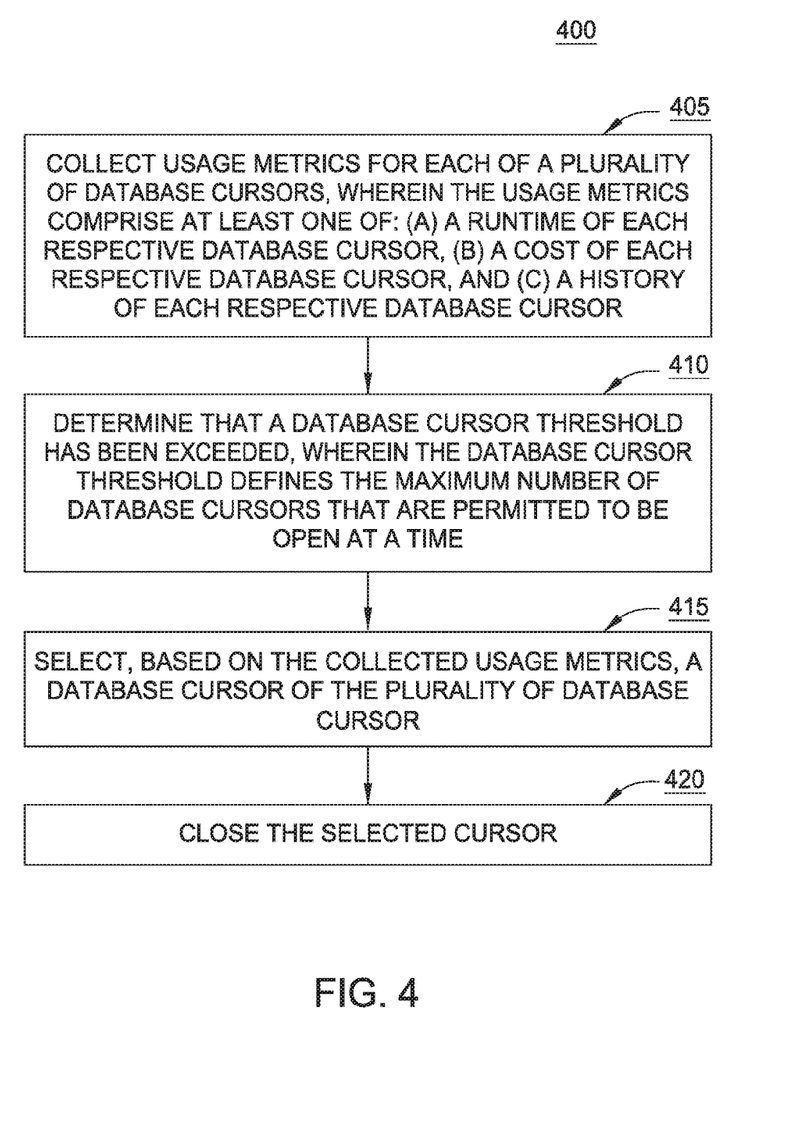
FIG. 4 is a flow diagram illustrating a method for intelligently selecting a cursor to close when the cursor threshold has been reached.

FIG. 4 illustrates a flow diagram for a method for intelligently identifying cursors to be closed according to embodiments disclosed herein. The method 400 begins at block 405, where Cursor Manager 174 collects usage metrics for each of a plurality of database cursors, wherein the usage metrics comprise at least one of: (a) a runtime of each respective database cursor, (b) a cost of each respective database cursor, and (c) a history of each respective database cursor. The method 400 continues to block 410, where Cursor Manager 174 determines that a database cursor threshold has been exceeded, wherein the database cursor threshold defines the maximum number of database cursors that are permitted to be open at a time. At block 415, Cursor Manager 174 selects, based on the collected usage metrics, a database cursor of the plurality of database cursors. Finally, the method 400 completes at block 420 where Cursor Manager 174 closes the selected cursor.

While the foregoing is directed to embodiments of the present invention, other and further embodiments of the invention may be devised without departing from the basic scope thereof, and the scope thereof is determined by the claims that follow.

What is claimed is:

1. A computer-readable storage medium containing computer program code that, when executed by operation of one or more computer processors, performs an operation comprising:

collecting usage metrics for each of a plurality of database cursors, wherein the usage metrics further comprise a number of other database cursors that are associated with a job with which each respective database cursor is associated;

calculating a cost of each respective database cursor based on the collected usage metrics, wherein the cost describes an estimated amount of time to rebuild the respective database cursor, if closed, relative to an average runtime of the respective database cursor, and wherein the cost is calculated further based on at least one of: (a) a size in memory of each respective database cursor, and (b) an amount of resources that are required when each respective database cursor is used;

upon determining that a database cursor threshold has been exceeded, wherein the database cursor threshold defines the maximum number of database cursors that are permitted to be open at a time:
    selecting, based on the calculated costs, a database cursor of the plurality of database cursors; and
    closing the selected cursor.

2. The computer-readable storage medium of claim 1, wherein the cost of each respective database cursor is further calculated based on a history of each respective database cursor, wherein the history comprises at least one of: (a) a measure of a frequency with which each respective database cursor is reused, and (b) how long each respective database cursor is likely to remain open before being closed by a respective thread or job.

3. The computer-readable storage medium of claim 1, wherein the usage metrics further comprise at least one of: (a) a number of users who have used each respective database cursor, (b) a number of threads which have accessed each respective database cursor, (c) a number of jobs which have used each respective database cursor, and (d) a number of applications which have accessed each respective database cursor.

4. The computer-readable storage medium of claim 1, wherein selecting the database cursor of the plurality of database cursors is not based on a time at which the database cursor was created or an amount of time since the database cursor was created.

5. A computer-readable storage medium containing computer program code that, when executed by operation of one or more computer processors, performs an operation comprising:
    collecting usage metrics for each of a plurality of database cursors, wherein the usage metrics further comprise a number of other database cursors that are associated with a job with which each respective database cursor is associated;
    calculating a cost of each respective database cursor based on the collected usage metrics, wherein the cost describes an estimated amount of time to rebuild the respective database cursor, if closed, relative to an average runtime of the respective database cursor, and wherein the cost is calculated further based on a history of each respective database cursor, wherein the history comprises at least one of: (a) a measure of a frequency with which each respective database cursor is reused, and (b) how long each respective database cursor is likely to remain open before being closed by a respective thread or job;
    upon determining that a database cursor threshold has been exceeded, wherein the database cursor threshold defines the maximum number of database cursors that are permitted to be open at a time:
        selecting, based on the calculated costs, a database cursor of the plurality of database cursors; and
        closing the selected cursor.

6. The computer-readable storage medium of claim 5, wherein the cost of each respective database cursor is further calculated based on at least one of: (a) a size in memory of each respective database cursor, and (b) an amount of resources that are required when each respective database cursor is used.

7. The computer-readable storage medium of claim 5, wherein the usage metrics further comprise at least one of: (a) a number of users who have used each respective database cursor, (b) a number of threads which have accessed each respective database cursor, (c) a number of jobs which have used each respective database cursor, and (d) a number of applications which have accessed each respective database cursor.

8. The computer-readable storage medium of claim 5, wherein selecting the database cursor of the plurality of database cursors is not based on a time at which the database cursor was created or an amount of time since the database cursor was created.

9. A computer-readable storage medium containing computer program code that, when executed by operation of one or more computer processors, performs an operation comprising:
    collecting usage metrics for each of a plurality of database cursors, wherein the usage metrics further comprise at least one of: (a) a number of users who have used each respective database cursor, (b) a number of threads which have accessed each respective database cursor, (c) a number of jobs which have used each respective database cursor, and (d) a number of applications which have accessed each respective database cursor;
    calculating a cost of each respective database cursor based on the collected usage metrics, wherein the cost describes an estimated amount of time to rebuild the respective database cursor, if closed, relative to an average runtime of the respective database cursor, wherein the cost is calculated further based on at least one of: (a) a size in memory of each respective database cursor, (b) an amount of resources that are required when each respective database cursor is used, and (c) a history of each respective database cursor, wherein the history comprises at least one of: (i) a measure of a frequency with which each respective database cursor is reused, and (ii) how long each respective database cursor is likely to remain open before being closed by a respective thread or job;
    upon determining that a database cursor threshold has been exceeded, wherein the database cursor threshold defines the maximum number of database cursors that are permitted to be open at a time:
        selecting, based on the calculated costs, a database cursor of the plurality of database cursors; and
        closing the selected cursor.

10. The computer-readable storage medium of claim 9, wherein the usage metrics further comprise a number of other database cursors that are associated with a job with which each respective database cursor is associated.

11. The computer-readable storage medium of claim 9, wherein selecting the database cursor of the plurality of database cursors is not based on a time at which the database cursor was created or an amount of time since the database cursor was created.

* * * * *